United States Patent [19]

Pomeroy

[11] Patent Number: 4,641,566
[45] Date of Patent: Feb. 10, 1987

[54] METHOD FOR DETECTING BURIED LAND MINES BY NON-DESTRUCTIVE MEANS

[76] Inventor: Robert L. Pomeroy, 29 Clarence Street, Dartmouth, Devon, England

[21] Appl. No.: 506,770

[22] Filed: Jun. 22, 1983

[51] Int. Cl.[4] .......................... F42D 5/02; G01V 3/11; G21H 5/02
[52] U.S. Cl. ..................... 89/1.13; 89/1.11; 250/303; 324/226; 324/326
[58] Field of Search ................. 324/326–329, 324/333–343, 345–346, 214–216, 66, 67; 89/1.11, 1.13; 250/303, 302

[56] References Cited

U.S. PATENT DOCUMENTS

| | | | |
|---|---|---|---|
| 2,401,723 | 6/1946 | Deming | 89/1.11 X |
| 2,925,038 | 2/1960 | Walker | 89/1.11 X |
| 3,146,349 | 8/1964 | Jordan | 250/303 X |
| 3,255,352 | 6/1966 | Johnston | 250/303 |
| 3,265,598 | 8/1966 | Rohrman | 89/1.13 X |
| 3,392,384 | 7/1968 | Wesch | 324/329 X |
| 3,836,842 | 9/1974 | Zimmermann et al. | 324/329 X |
| 4,019,053 | 4/1977 | Levine | 250/303 |
| 4,063,510 | 12/1977 | Ishii et al. | 324/214 X |

Primary Examiner—Gerard R. Strecker
Assistant Examiner—Warren S. Edmonds
Attorney, Agent, or Firm—James C. Wray

[57] ABSTRACT

Buried plastic mines or nonmetallic objects are located by spraying a suspected area with a leach of ionized metal and leaching the ionized metal into the soil to leave a metallic concentrate on an impervious object, such as a plastic mine. An array of detectors detects anomalies of concentrations of the metal, the concentrations being the result of the leach settling on or about the impervious object.

12 Claims, 13 Drawing Figures

METHOD FOR DETECTING BURIED LAND MINES BY NON-DESTRUCTIVE MEANS

BACKGROUND OF THE INVENTION

Buried mines are one of the most widely used and lethal weapons of war. Mines made of metal are easily detected and cleared, but today, many are made of plastic. As plastic mines do not register on a mine detector, the mines can go on killing and maiming people and animals long after hostilities cease.

Unfortunately, wars are still being waged around the world, and wars probably will be waged for many years to come. Of the many victims of wars, possibly the most senseless are the non-combatants, many of them children, who are killed long after the wars are over and almost forgotten. Most of the post-war victims result from explosions of anti-personnel mines, which were never found because they were made of nonmetallic materials—intentionally so that they could not be located by mine detectors.

Most land mines used during World War II were encased in metal. They were cleared within a year or so of the end of the war. Nonmetallic mines made of wood or canvas disintegrated after a few years in the ground, and detonators became inactive. Unfortunately, current mine casings are often made of plastic, which cannot be located by mine detectors. As the plastic mines are waterproof, they remain active and lethal for many years.

This is a problem for which many people in many countries are trying to find a solution. Current work has concentrated on detecting thermal differences between soil which has been disturbed and surrounding earth. That solution, if perfected, would have high utility, because it would allow clearance of paths through mine fields shortly after the mines have been laid. Unfortunately, as time goes by, temperature differences vanish, and thermal detectors would no longer function. Although paths may have been cleared to mined areas using the thermal detectors, the main field is left intact.

While it is highly desirable to locate underground plastic mines and to excavate and deactivate the mines, the present state of the art does not meet the object. Consequently, it is necessary to explode the mines by bombarding expected mine fields with explosives or projectiles which detonate the mines or by driving mechanical snakes across mine fields or by advancing mechanical beaters using heavily armored vehicles or by driving flocks of animals over mine fields in the hope of sacrificing animals to save human lives.

The problem remains unsolved at this time. Focus on the problem and attempts at solution are particularly heightened at this time by mine fields which remain in the Falklands, Afghanistan and Iraq and, in fact, any place where wars have passed by.

SUMMARY OF THE INVENTION

The present invention solves the problem of locating underground objects by distributing a substance over a surface beneath which objects are thought to be positioned.

The material seeps into the ground, and concentration of the material, at least within a predetermined distance beneath the surface, is affected by objects beneath the ground.

While any detectable materials can be used, the materials thought to be most desirable are ionized metals, which may readily be sprayed in solutions over a surface of the ground with the vehicle of the spray being useful in dispersing the material into the ground beneath the surface. The material may be dispersed as a dust upon the surface of the ground, followed by a spraying of liquid, such as water, which solubilizes or suspends the material and carries the material into the ground. Migration of the sprayed or dusted material into the ground may be affected or augmented by natural water fall or collection, such as by rain or dew.

The detectable material may be any material which is readily detectable and which may be carried into the ground. For example, the material may be a soluble or insoluble material which is tagged with a radioactive substance. The material may be any material which will either concentrate on the surface of an object sought to be detected or which will tend to move away from such surface or whose detectability will be preferentially deactivated by such surface.

In a preferred embodiment, the material used is a material which preferentially concentrates on the surface of a mine by chemically bonding to the surface or physically concentrating on the surface. For example, the material may seep into the ground and may be prevented from further seepage into the ground by the object sought to be located. Alternatively, the material may seep into the ground and may be prevented from further seeping into the ground beneath the object sought to be located, whereupon the material moves outward and downward around the object, making the object identifiable through the anomaly of reduced concentration of the detectable material.

Alternatively, the material may seep into the ground preferentially in the area of disturbed earth, either concentrating the material in that area of disturbed earth or de-concentrating the material. The detection of the anomalies of concentration may be made in such a way that the detection detects concentrations within specific distances beneath the surface of the ground, which distances include the usual depths of burying types of mines which are expected.

The preferred embodiment of the invention sprays a mine field with a leach of ionized metal that seeps through the ground and leaves a metallic concentrate on a plastic mine. The mine then is located by a modified version of conventional magnetic-field metal detectors. In times of peace, the system can be used by archeologists to locate and identify building outlines and terra cotta, glass and other nonmetallic artifacts.

All metals dissolve in some solution. Gold, silver and platinum are the most difficult to dissolve, but even they can be ionized and carried away in solution and later precipitated by one or a combination of chemical treatments. Precious metals may be used or other metal ions, such as iron, lead, zinc, manganese and so forth, may be used. It is preferable to use a leach with enough ionized metal to leave a deposit or film sufficiently dense on a cover of a mine to react to a magnetic field. Fortunately, for the purpose of detection, mines are laid at a very shallow depth so that the mineral-bearing solution will not have to percolate far before reaching the mine. The time necessary to deposit the reflective or reactive layer will depend on the nature of the soil, such as sand, loam, clay, etc., as well as the amount of humidity that the soil contains. Composition and quantity of the leach is chosen according to soil composition and conditions. The time required for saturation and deposit is selected according to soil composition, compaction and other characteristics, as well as the amount of fluid laid in the spray and the ambient natural conditions.

When a metallic solution having an affinity for the polymer used in the mine casings is employed, any conventional metal or mine detector may be used to locate the mine.

In one form of the invention, the solution will leave a metallic deposit on any impervious underground object. A stone a few inches under the surface might very well build up enough metallic shield—relatively few microns—to register on a magnetic-field detector. False positives, such as detecting stones instead of mines, may be cumbersome but are preferable to false negatives. The metal detector or mine detector may be modified to recognize the desired shapes or sizes of metal-coated deposits. Revealing the actual shape of the metal-coated object is preferable to revealing only that a metallic object exists.

One particular form of detector is a rotating head which registers as it passes over the coated object and discontinues its indication as it rotates away from the object. A ring or other array of micro-detectors can produce the desired shape recognition. The array may be activated in sequence, and the indication may register on a luminiscent screen, such as a cathode ray tube or a radar screen.

In a preferred form of the invention, a mine field is sprayed by a solvent containing an emulsion of ionized metal. The solution is allowed to percolate through the soil for a period of time which is necessary to bring the material into contact with buried mines. The area is then scanned by a metal detector, possibly, remote controlled, and the locations of mines or other suspicious objects are marked for later removal or detonation.

The preferred method of detecting buried mines comprises depositing material on a suspected mine field, allowing the material to disperse into the ground, detecting differential levels of material in the ground and locating suspected mines according to detected differentials.

Preferably, the distributing comprises spraying liquid over the suspected mine field, especially spraying a solution of detectable materials over the ground. Preferably, a solution with metal ions is sprayed over the ground.

In one embodiment, the dispersing step includes spraying the ground with additional matter to encourage downward dispersing of the materials into the ground. Typically, the dispersing step includes dispersing the materials into the ground with water.

In a preferred embodiment, the detecting step comprises detecting differential of material concentration with an array of detectors. Preferably, the detecting steps comprise detecting material concentration differentials by moving detectors. The detecting comprises detecting sensible concentrations of the material, preferably, within predetermined depths in the ground. Typically, the detecting step comprises detecting high concentrations of material.

A preferred method of detecting buried mines includes distributing materials over a suspected mine field, dispersing the materials into earth in the suspected mine field, concentrating materials on mines within the suspected mine field and measuring concentrations of materials in the mine field. Usually, the distributing comprises spraying solutions having metal ions over a surface of the earth. The dispersing further includes attaching metallic ions to plastic surfaces of mines. Typically, the measuring comprises measuring metal ions concentrated within a predetermined depth beneath a surface of the earth.

The attaching includes preferentially attaching metallic ions to plastic surfaces.

A preferred method of locating objects under an earth surface comprises distributing detectable material over a surface of the earth, leaching the material into the earth, concentrating the material on objects beneath the surface of the earth and detecting concentrations of materials beneath the surface of the earth with detectors above the surface of the earth.

Preferably, the concentrating includes coating objects with the detectable material, and the coating includes preferentially coating objects desired to be located with the material.

These and other and further objects of the invention are apparent in the disclosure which includes the foregoing specification, with its appended claims, and the drawings.

DETAILED DESCRIPTION OF THE DRAWINGS

Figure 1:
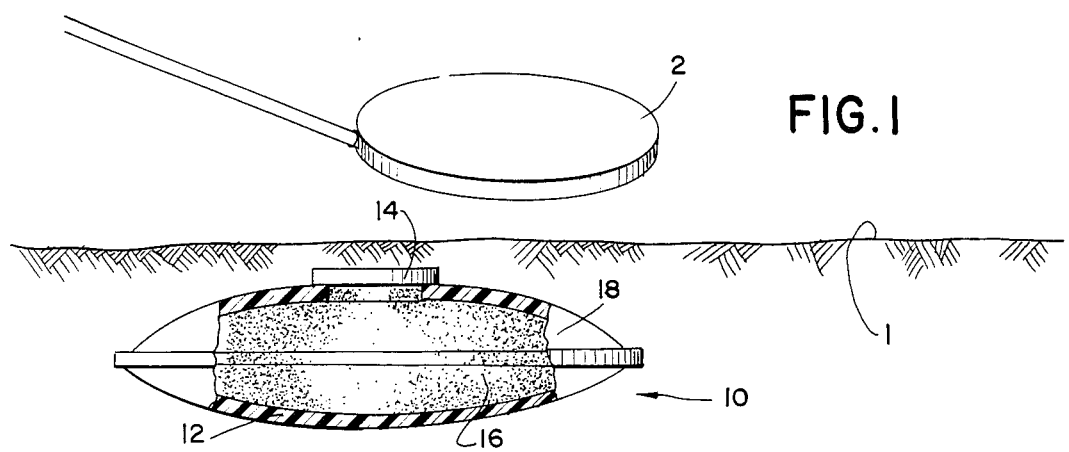
FIG. 1 is a schematic representation of a conventional mine detector trying to locate a plastic mine without success.

As shown in FIG. 1, a plastic mine 10 is buried beneath the surface 1 of the earth. A conventional mine detector 2 is incapable of sensing the plastic mine. Anyone attempting the use of such a mine detector in a suspected mine field has a high likelihood of becoming a victim of a mine explosion.

The casing 12 of mine 10 is made of a synthetic polymeric material. Usually, a nonmetallic detonator 14 is centered on top of the casing 12, and an explosive charge 16 is packed within the casing.

A mine may be of any shape. Conventional anti-personnel mines have downward curved upper surfaces 18, which aid in widening the lethal range of the explosion when detonator 14 is activated.

Figure 2:
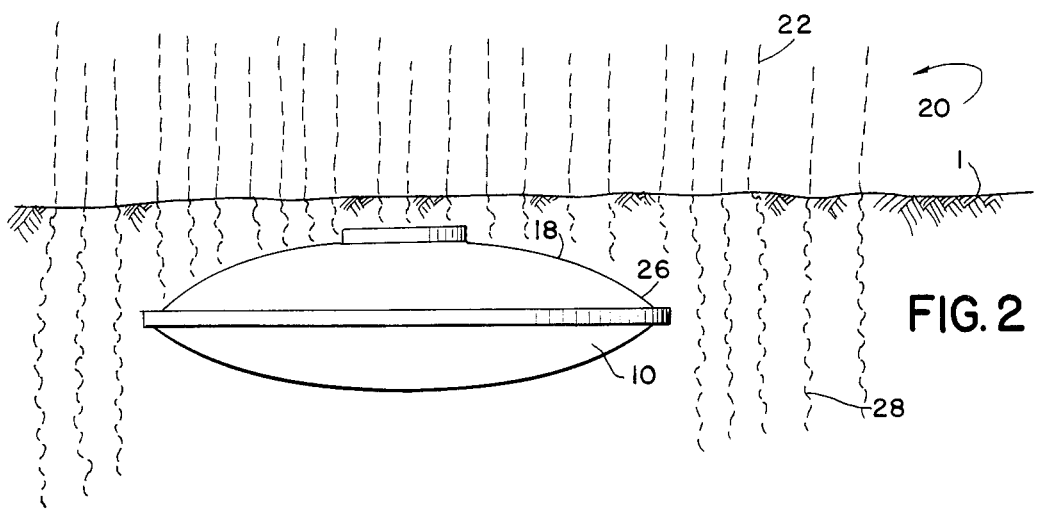
FIG. 2 is a schematic representation of spraying and percolating a solution containing a recognition material into the ground around a mine.

As shown in FIG. 2, a preferred form of the invention is generally indicated by the number 20. A detectable material is distributed, such as by spraying a detectable solution 22 uniformly over a surface 1 of a suspected mine field. Because of the preferred nature of the solution, the detectable material is quickly carried into the ground by percolation 24, where some of the material 26 concentrates on the upper surface 18 of mine 10 and some of the material 28 continues downward into the ground.

Figure 3:
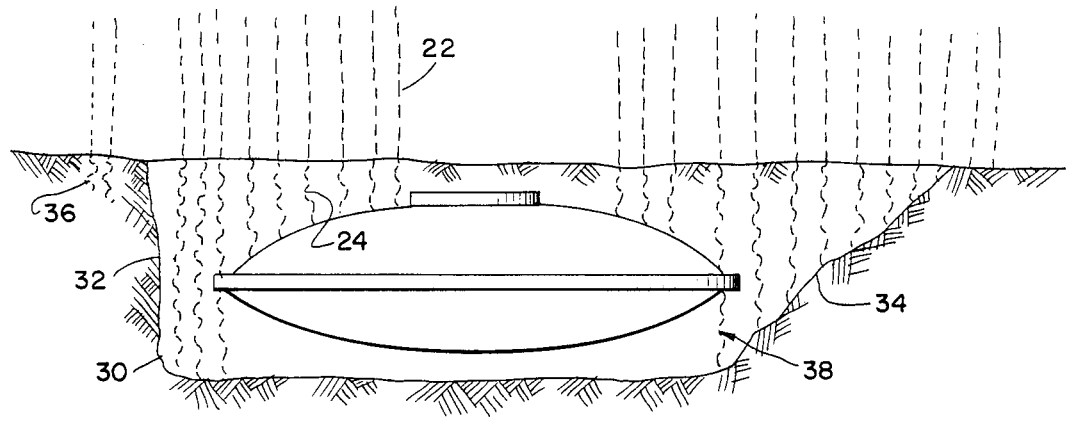
FIG. 3 is a schematic detail of percolations around a buried mine.

Alternately, as shown in FIG. 3, in highly compressed soils in which holes 30 are dug to bury mines, the spray 22 may percolate 24 into the soil in patterns governed by the mine, as well as by vertical walls 32 and sloping walls 34 of the excavation 30. Percolation may be retarded 36 in compacted areas of no excavation, and percolated material may be concentrated 38 by sloping walls 34 of excavations. Anomalous patterns of distribution may be created in highly compacted soils which might indicate a high surface concentration of the detectable material, a relatively lower concentration on a surface of a mine, and a lower concentration in areas of excavation around the mine. The anomalous concentrations, high or low or intermediate, in the area of the mine would reveal the mine's location.

Figure 4:
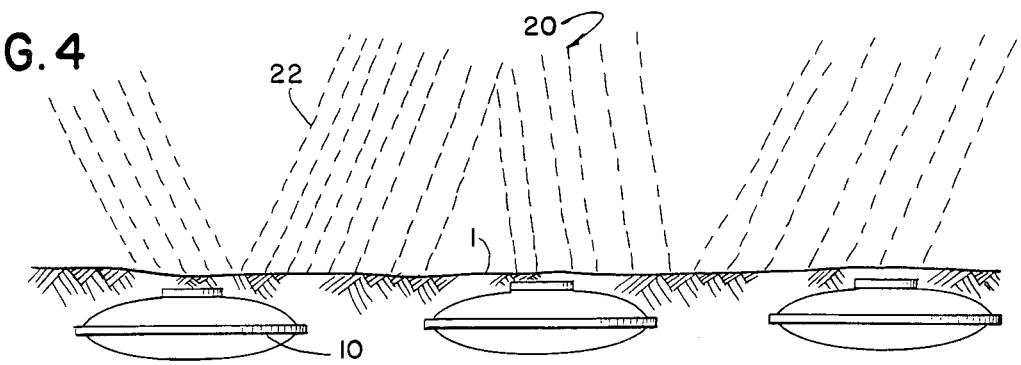
FIG. 4 is a schematic representation of the step of distributing detectable material on a mine field.

As shown in FIG. 4, the surface of the ground 1 in a suspected mine field is sprayed 22, such as from a helicopter, a low-flying aircraft or from a long nozzle from a safe surface location. The spraying 22 is more or less uniform. Uniformity of the spraying is not critical since, if a sufficient amount of detectable material is deposited over a surface area, patterns indicating mines will be recognizable.

Figure 5:
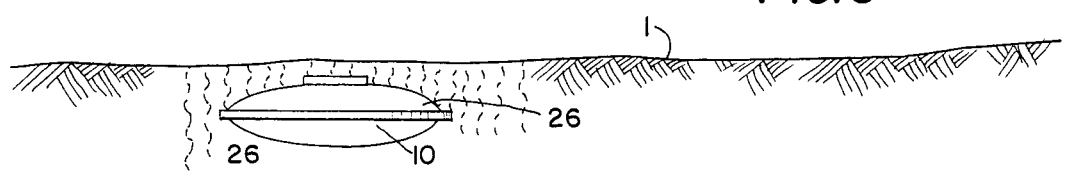
FIG. 5 is a schematic detail of the percolating step.
Figure 6:
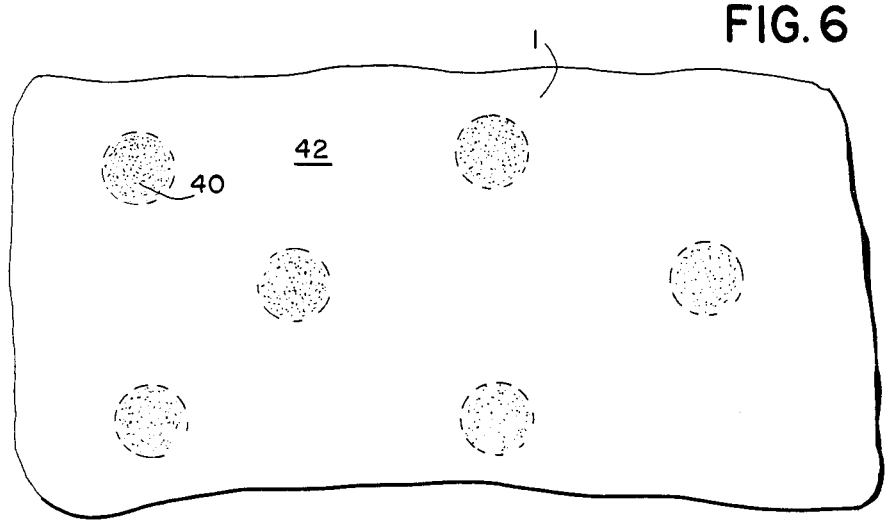
FIG. 6 is a detail of concentrations.

As shown in FIG. 5, the solution percolates 24 downward through the earth and coats 26 the upper surface of a mine 10. Subsequent scanning of the surface area reveals the patterns of concentrations 40 indicating mines and voids 42 indicating no mines.

Figure 7:
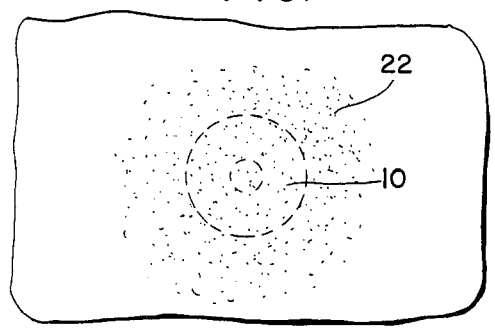
FIG. 7 is a plan detail of spraying detectable material in the area of a mine.
Figure 8:
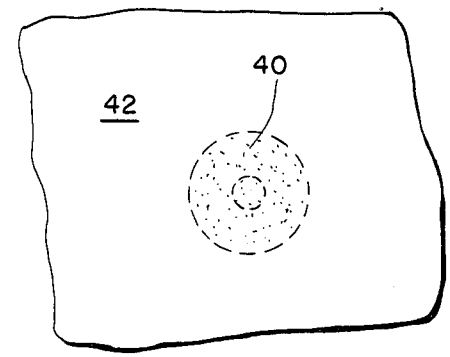
FIG. 8 is a plan detail of the detectable material being concentrated on a mine after percolation.

As shown in FIG. 7, the spray 22 is generally even on the surface area covering the mine 10. After percolation, the detectable material coats the mine with a recognizable shape 40, as compared with the reduced concentration 42.

Figure 9:
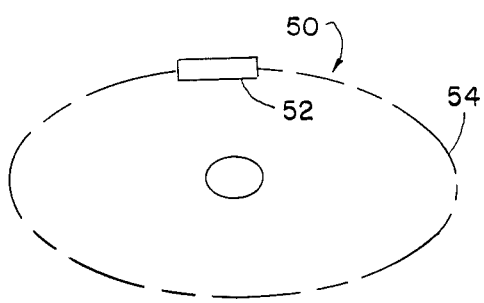
FIG. 9 is a schematic representation of a detector head having a revolving detector.
Figure 10:
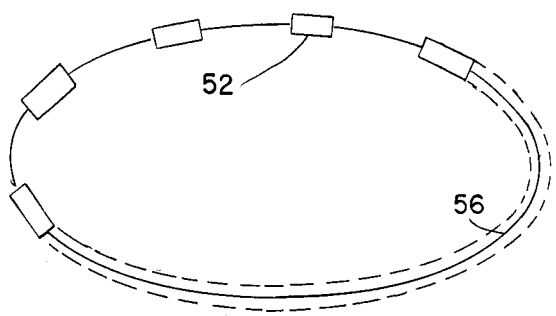
FIG. 10 is a schematic plan view of a detector head having a circular detector array.
Figure 11:
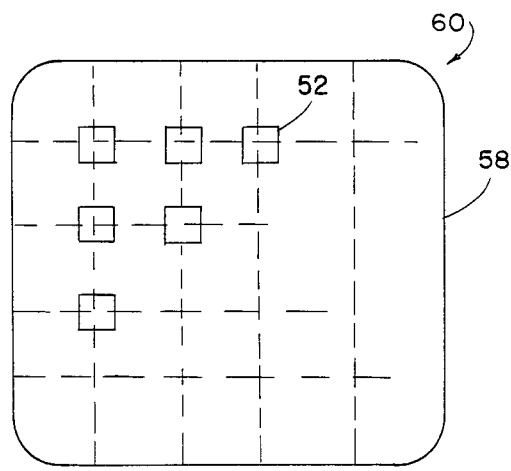
FIG. 11 is a schematic plan view of a detector head having a rectangular array of detectors.

Preferred forms of detectors are shown in FIGS. 9 through 11. The detector head 50 in FIG. 9 has a single detector 52 which is moved in a circular pattern, such as by revolving the disk 54 on which detector 52 is mounted.

FIG. 10 shows plural detectors 52 mounted on a circular array on disk 56. FIG. 11 shows a head 60 which has plural detectors 52 mounted in a rectangular array on the horizontal support 58, which may be rectangular or any other shape.

Figure 12:
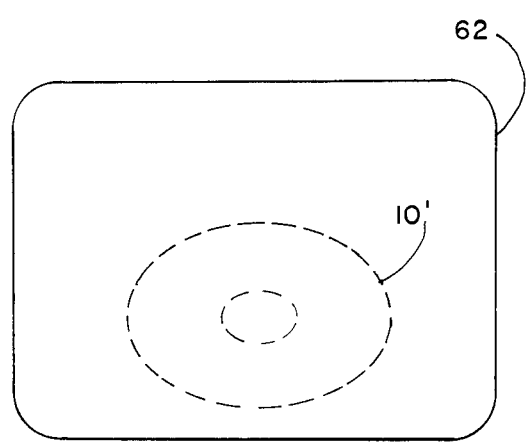
Figure 13:
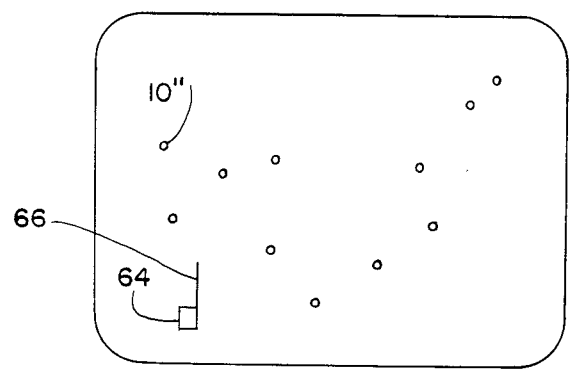

The detectors produce an indication of a mine on a screen 62, as shown in FIG. 12, by indicating a classic mine shape 10' with a conventional CRT luminescent raster sweep.

The detector may have a memory device which displays a plot of located mines 10" in relation to a fixed point 64 and a known direction 66.

While the invention has been described with reference to specific embodiments, the exact scope and nature of the invention are defined in the following claims.

I claim:

1. The method of detecting buried mines comprising spraying detectable materials over a suspected mine field, dispersing the detectable materials into earth in the suspected mine field by percolation and measuring concentrations of materials in the mine field with detectors capable of detecting the detectable materials, said concentrations being the result of detectable materials accumulating on or about buried mines.

2. The method of detecting buried mines of claim 1 wherein the spraying of detectable materials is spraying solutions having metal ions over a surface of the earth.

3. The method of detecting buried mines of claim 1 wherein the measuring comprises measuring metal ions concentrated within a predetermined depth beneath a surface of the earth, said predetermined depth corresponding to the depth at which mines are buried.

4. The method of locating objects under an earth surface comprising spraying detectable material over a surface of the earth, leaching the material into earth, wherein the detectable material is collected on objects beneath the surface of the earth in detectable quantities and detecting concentrations of material beneath the surface of the earth with detectors capable of detecting concentrations of the detectable materials.

5. The method of detecting buried objects of claim 4 wherein the spraying comprises spraying solutions having metallic ions over a surface of the earth.

6. The method of detecting objects of claim 5 wherein the spraying comprises carrying metallic ions into the earth with water.

7. The method of locating objects of claim 4 wherein the collection of detectable material comprises coating objects with the detectable material.

8. A method of detecting non-metallic buried mines comprising,
    depositing material on a suspected mine field,
    allowing the material to disperse into the ground,
    detecting differential levels of material in the ground, and
    locating suspected mines according to detected differential levels of material, wherein the depositing comprises spraying a liquid solution containing metal ions over the suspected mine field, said solution providing a leach that concentrates on or about buried mines, said leach being detectable by detector means capable of distinguishing between greater and lesser concentrations of metal ions.

9. The method of claim 8 wherein the detector means are a type of conventional magnetic-field metal detectors.

10. The method of claim 8 wherein the solution containing metal ions includes a metal selected from a group consisting of gold, silver, platinum, iron, lead, zinc, and manganese.

11. The method of claim 8 wherein the detector means has a rotating head which registers as it passes over concentrations of leach and discontinues its indication as it rotates away from said concentrations.

12. The method of claim 8 wherein the detector means comprises plural micro-detectors disposed in a ring to provide shape recognition of underground objects.

* * * * *